US010402524B2

(12) United States Patent
Cao et al.

(10) Patent No.: US 10,402,524 B2
(45) Date of Patent: Sep. 3, 2019

(54) PREDICTION OF PROCESS-SENSITIVE GEOMETRIES WITH MACHINE LEARNING

(71) Applicant: GLOBALFOUNDRIES Inc., Grand Cayman (KY)

(72) Inventors: Liang Cao, Clifton Park, NY (US); Jie Zhang, Clifton Park, NY (US); David N. Power, Saratoga Springs, NY (US); Eric S. Parent, Saratoga Springs, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 29 days.

(21) Appl. No.: 15/588,984

(22) Filed: May 8, 2017

(65) Prior Publication Data

US 2018/0322234 A1 Nov. 8, 2018

(51) Int. Cl.
*G06F 17/50* (2006.01)
*G03F 1/36* (2012.01)

(52) U.S. Cl.
CPC .......... *G06F 17/5036* (2013.01); *G03F 1/36* (2013.01); *G06F 17/5068* (2013.01); *G06F 17/5081* (2013.01); *G06F 17/5072* (2013.01); *G06F 2217/12* (2013.01)

(58) Field of Classification Search
CPC ............ G06F 17/5036; G06F 17/5072; G06F 2217/06; G06F 2217/12; G03F 1/36; G03F 1/84
See application file for complete search history.

(56) References Cited

U.S. PATENT DOCUMENTS

| | | | |
|---|---|---|---|
| 5,801,954 A | 9/1998 | Le et al. | |
| 6,263,299 B1 | 7/2001 | Aleshin et al. | |
| 6,577,406 B2 * | 6/2003 | Bruce | G03F 7/70641 356/625 |
| 7,018,746 B2 * | 3/2006 | Cui | G03F 1/36 430/30 |
| 7,191,428 B2 | 3/2007 | Tang et al. | |
| 7,853,920 B2 * | 12/2010 | Preil | G03F 1/84 382/149 |
| 8,041,103 B2 * | 10/2011 | Kulkarni | G06F 17/5045 382/144 |

(Continued)

*Primary Examiner* — Helen Rossoshek
(74) *Attorney, Agent, or Firm* — Anthony Canale; Hoffman Warnick LLC

(57) ABSTRACT

Methods according to the disclosure include: predicting process-sensitive geometries (PSGs) in a proposed IC layout based on violations of a set of processing constraints for the proposed IC layout, the set of processing constraints being calculated with a predictive model based on a training data repository having a plurality of optical rule check (ORC) simulations for different IC layouts; identifying actual PSGs in a circuit manufactured using the proposed IC layout; determining whether the predicted PSGs correspond to the actual PSGs in the manufactured circuit as being correct; in response to the predicting being incorrect: adjusting the predictive model based on the actual PSGs, wherein the adjusting includes submitting additional ORC data to the training data repository; and flagging the proposed IC layout as incorrectly predicted; and in response to the predicting being correct, flagging the proposed IC layout as correctly predicted.

14 Claims, 7 Drawing Sheets

(56) References Cited

U.S. PATENT DOCUMENTS

| | | | |
|---|---|---|---|
| 8,799,830 B2 * | 8/2014 | Robles | G06F 17/5022 |
| | | | 716/51 |
| 8,880,382 B2 * | 11/2014 | Bagheri | G03F 1/36 |
| | | | 703/6 |
| 9,064,084 B2 * | 6/2015 | Katakamsetty | G06F 17/5081 |
| 2006/0271906 A1 | 11/2006 | Tang et al. | |
| 2009/0007030 A1 * | 1/2009 | Nehmadi | G03F 1/36 |
| | | | 716/136 |
| 2014/0282288 A1 * | 9/2014 | Dai | G06F 17/5009 |
| | | | 716/51 |
| 2015/0154746 A1 * | 6/2015 | Zafar | G03F 1/84 |
| | | | 382/149 |
| 2015/0213374 A1 * | 7/2015 | Agarwal | G06F 17/50 |
| | | | 706/12 |
| 2016/0292342 A1 * | 10/2016 | Han | G06F 17/5081 |
| 2016/0300338 A1 * | 10/2016 | Zafar | G06T 7/001 |
| 2019/0019280 A1 * | 1/2019 | Rao | G06T 7/001 |
| 2019/0101834 A1 * | 4/2019 | Cao | G03F 7/70441 |

* cited by examiner

PREDICTION OF PROCESS-SENSITIVE GEOMETRIES WITH MACHINE LEARNING

BACKGROUND

Technical Field

The present disclosure relates to integrated circuits (ICs). More specifically, the present disclosure relates to processes for predicting process-sensitive geometries (PSGs) with the aid of machine learning.

Related Art

Fabrication foundries ("fabs") can manufacture ICs using photolithographic processes. Photolithography is an optical printing and fabrication process by which patterns on a photolithographic mask (i.e., photomask) are imaged and defined onto a photosensitive layer coating of a substrate. To manufacture an IC, photomasks are created using an IC layout as a template. The photomasks contain the various geometries of the IC layout, and these geometries can be separated with layers of photoresist material. The various geometries contained on the photomasks correspond to the various base physical IC elements that make up functional circuit components such as transistors, interconnect wiring, via pads, as well as other elements that are not functional circuit elements but are used to facilitate, enhance, or track various manufacturing processes. Through sequential use of the various photomasks corresponding to a given IC in an IC fabrication process, a large number of material layers of various shapes and thicknesses with different conductive and insulating properties may be built up to form the overall IC and the circuits within the IC layout.

As integrated circuit (IC) components have continued to decrease in size, improvements to scale have spawned design implementation issues for some types of geometries, e.g., in complementary metal-oxide-semiconductor (CMOS) ICs with geometries sized less than approximately twenty-two nanometers (nm). As IC technology continues to shrink, the growing need for empirical data from a design may exacerbate the uncertainty of the manufacturing process, thereby increasing the risk of defects or impaired operability. Conventional approaches for traversing physical limits may apply manual or computer-implemented techniques for increasing the resolution of chips printed using optical lithography. One such technique is known as optical proximity correction (OPC). OPC is a computational method for correcting irregularities and distortions arising from diffraction effects by the transforming of mask geometries.

Although OPC has proven effective for accounting for diffraction effects during integrated IC manufacture, some OPC tools may not fully account for manufacturing variations caused by further reductions in the size of a product and its various components. To enhance the effectiveness of OPC techniques, a circuit fabricator may apply one or more optical rule checking (ORC) simulations for identifying portions of a circuit with significant amounts of manufacturing sensitivity. An ORC simulation may allow manufacturers to simulate IC fabrication under multiple process variants (e.g., light intensity, image contrast at edges, etc.) to identify portions of an IC structure which may be sensitive to manufacturing variations. Significant risks in ORC simulation can include overcompensation for weaknesses in an IC layout by identifying too many sensitive circuit geometries, and/or under compensation for such weaknesses by failing to identify sensitive circuit geometries in a particular simulation. The effectiveness of an ORC library applied to the circuit during manufacture thus may constrain a manufacturer's ability to use OPC in the production of a product.

SUMMARY

A first aspect of the disclosure provides a method including: predicting process-sensitive geometries (PSGs) in a proposed IC layout based on violations of a set of processing constraints for the proposed IC layout, the set of processing constraints being calculated with a predictive model based on a training data repository having a plurality of optical rule check (ORC) simulations for different IC layouts; identifying actual PSGs in a circuit manufactured using the proposed IC layout; determining whether the predicted PSGs correspond to the actual PSGs in the manufactured circuit as being correct; in response to the predicting being incorrect: adjusting the predictive model based on the actual PSGs, wherein the adjusting includes submitting additional ORC data to the training data repository; and flagging the proposed IC layout as incorrectly predicted; and in response to the predicting being correct, flagging the proposed IC layout as correctly predicted.

A second aspect of the disclosure provides a computer program product stored on a computer readable storage medium, the computer program product including program code, which, when being executed by at least one computing device, causes the at least one computing device to: predict process-sensitive geometries (PSGs) in a proposed IC layout based on violations of a set of processing constraints for the proposed IC layout, the set of processing constraints being calculated with a predictive model based on a training data repository having a plurality of optical rule check (ORC) simulations for different IC layouts; identify actual PSGs in a circuit manufactured using the proposed IC layout; determine whether the predicted PSGs correspond to the actual PSGs in the manufactured circuit as being correct; in response to the predicted PSGs being incorrect: adjust the predictive model based on the actual PSGs, wherein the adjusting includes submitting additional ORC data to the training data repository; and flag the proposed IC layout as incorrectly predicted; and in response to the predicted PSGs being correct, flagging the proposed IC layout as correctly predicted.

A third aspect of the present disclosure provides system including at least one computing device configured to perform a method by performing actions including: predict process-sensitive geometries (PSGs) in a proposed IC layout based on violations of a set of processing constraints for the proposed IC layout, the set of processing constraints being calculated with a predictive model based on a training data repository having a plurality of optical rule check (ORC) simulations for different IC layouts; identify actual PSGs in a circuit manufactured using the proposed IC layout; determine whether the predicted PSGs correspond to the actual PSGs in the manufactured circuit as being correct; in response to the predicted PSGs being incorrect: adjust the predictive model based on the actual PSGs, wherein the adjusting includes submitting additional ORC data to the training data repository; and flag the proposed IC layout as incorrectly predicted; and in response to the predicted PSGs being correct, flagging the proposed IC layout as correctly predicted.

Figure 1:
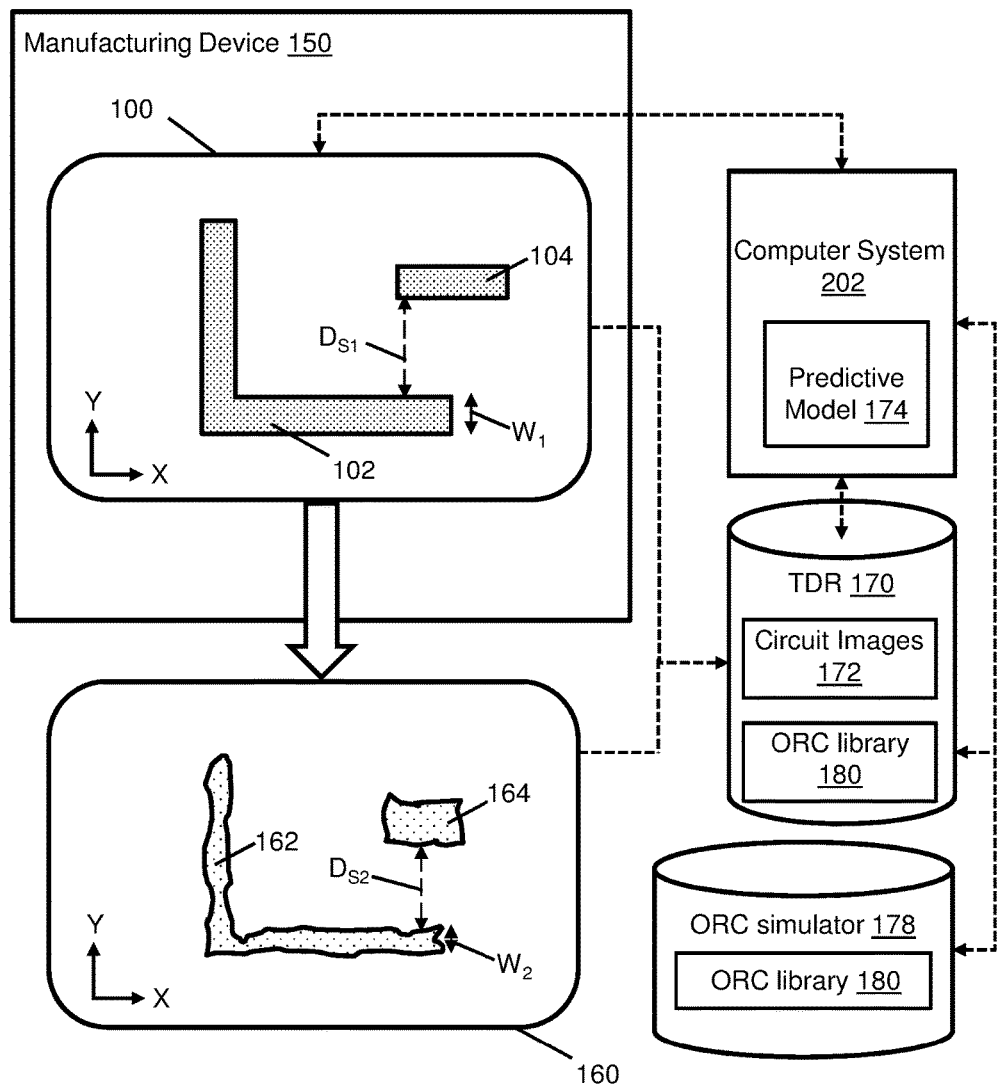
FIG. 1 provides a schematic data flow diagram of components and processes for manufacturing a circuit from an IC layout with optical rule check (ORC) models according to embodiments of the disclosure.

It is noted that the drawings of the disclosure are not necessarily to scale. The drawings are intended to depict only typical aspects of the invention, and therefore should not be considered as limiting the scope of the invention. In the drawings, like numbering represents like elements between the drawings.

DETAILED DESCRIPTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings, and it is to be understood that other embodiments may be used and that changes may be made without departing from the scope of the present teachings. The following description is, therefore, merely illustrative.

INTRODUCTION AND GENERAL DEFINITIONS

Embodiments of the disclosure can use machine-learning techniques for predicting where process-sensitive geometries (PSGs) may appear integrated circuit (IC) layouts, and adjusting the simulations and reference data for making such predictions. Embodiments of the disclosure include systems, computer program products and methods employing a predictive model to predict the location of PSGs based on a set of calculated processing constraints. The method can include iteratively adjusting the predictive model based on circuits manufactured using the IC layout.

To better illustrate the various embodiments of the present disclosure, particular terminology which may be known or unknown to those of ordinary skill in the art is defined to further clarify the embodiments set forth herein. The term "system" can refer to a computer system, server, etc., composed wholly or partially of hardware and/or software components, one or more instances of a system embodied in software and accessible a local or remote user, all or part of one or more systems in a cloud computing environment, one or more physical and/or virtual machines accessed via the internet, other types of physical or virtual computing devices, and/or components thereof.

The term "IC layout" can refer to a digital rendering or similar representation of a complete or partial IC chip which includes a plurality of circuit geometries which may be stored, e.g., in a memory component of a computer system. A "region" refers to any subset of a given IC layout. A "pattern" refers to a representation of one or more elements in an IC layout, which may be transferred from the memory of a computer system onto a mask by way of, for example, direct-write electron beam lithography. Optical proximity correction (or "OPC") generally refers to a process by which an IC layout is simulated for printing by converting a set of ideal patterns into corrected shapes to account for one or more printing errors. Optical rule checking (or "ORC") refers to analyzing of a simulated aerial image of a particular IC layout under multiple process variants (e.g., light intensity, image contrast at edges, etc.) to predict which portions of an IC structure are most sensitive to manufacturing variations.

A "geometry" or "pattern geometry" refers to an estimated printing region of a given pattern in an OPC simulation, which may account for printing errors or related constraints. A "process-sensitive geometry (PSG)," sometimes identified as a "weak point," refers to a geometry in an IC layout with high sensitivity to manufacturing variations. PSGs can pose a risk to the quality of a product if manufacturing constraints such as light intensity vary significantly from their nominal or expected values. A "processing constraint" refers to one or more threshold values and/or qualifications set for one or more geometrical properties in a manufactured circuit, e.g., to indicate whether one or more patterns include PSG(s). Processing constraints may include predetermined variables, e.g., a width, separation distance, critical dimension under various process conditions or before or post etch, before or post CMP, layer to layer distance, layer to layer overlap, coverage of one layer to the other layer, the potential of geometry change because of mask shape change, the shape sensitivity to process condition change, topographic influence of other layers to detecting layer. etc., one or more of which may define whether the geometry is likely to be a PSG. Processing constraints may further include one or more algorithms, process flows, look-up-tables, etc., for correlating such variables with diagnostic assessments of various patterns in a particular IC layout. As such, processing constraints may incorporate a complex analysis of various characteristics in a particular circuit and/or layout thereof. A "critical dimension" refers to the smallest acceptable separation distance between two elements of a particular region, below which the elements cannot be reliably printed to a wafer or mask.

Circuit Manufacture with ORC Library

FIG. 1 provides schematic a schematic data flow diagram of components and processes for computer-aided circuit manufacture according to embodiments of the disclosure. FIG. 1 illustrates a proposed IC layout 100 indicative of at least a portion, in plane X-Y, of a product to be simulated and manufactured using optical proximity correction (OPC) and optical rule checking (ORC). Proposed IC layout 100 can include patterns 102, 104 to be printed at respective positions. Although two patterns 102, 104 are shown in proposed IC layout 100 for the purposes of demonstration only, it is understood that proposed IC layout 100 of FIG. 1 can represent only a portion of a larger IC layout to be printed. More specifically, proposed IC layout 100 depicted in FIG. 1 can represent a single region of proposed IC layout 100. Each region of proposed IC layout 100 may include multiple patterns 102, 104 which are in close physical proximity relative to other patterns, and/or may be functionally interrelated or designed to be manufactured together. In some cases, proposed IC layout 100 may include only a select group of regions and associated patterns 102, 104 which may provide a group of empirical data for OPC modeling and/or ORC simulation. Each pattern 102, 104 in proposed IC layout 100 can include corresponding widths in plane X-Y, e.g., $W_1$ of pattern 102. Patterns 102, 104 can be spaced apart, e.g., by a respective separation distance $D_{S1}$ along a corresponding axis (shown along Y-axis for the sake of example).

A manufacturing device 150 (e.g., a single manufacturing plant and/or a group of interconnected devices for producing a manufactured circuit 160 from a proposed layout) can be operable to receive proposed IC layout 100 and yield manufactured circuit 160 based on proposed IC layout 100. Manufactured circuit 160 can include one or more printed patterns 162, 164 formed based on, e.g., pattern(s) 102, 104 of proposed IC layout 100. Manufacturing device 150 can be operable to, e.g., cause manufacture of one or more printed patterns 162, 164 at positions designated with patterns 102, 104 in proposed IC layout 100. As shown, printed patterns 162, 164 can vary in size, shape, etc., from their corresponding patterns 102, 104 in proposed IC layout 100. Structural differences between patterns 102, 104 and printed patterns 162, 164 may be caused by processing variants, e.g., differences in light intensity, the position and operation of various components in manufacturing device 150, proximity effects from other patterns in proposed IC layout 100, etc. Printed patterns 162, 164 can also have, e.g., an X-Y width $W_2$ and separation distance $D_{S2}$, e.g., along Y-axis which may be similar to or different from separation distance $D_{S1}$ and/or width $W_1$ in proposed IC layout 100.

Systems according to the disclosure can include a training data repository (TDR) 170 of related ORC data ("related data") 172 corresponding to various IC layouts 100 and/or manufactured circuits 160, and which may include representations of patterns 102, 104 and/or printed patterns 162, 164. In accordance with embodiments of the disclosure, TDR 170 is connected to, and modified by a predictive model 174 including, e.g., one or more machine learning algorithms therein. Predictive model 174 can be housed, e.g., in a computer system 202, and the various machine learning algorithms therein can be trained by way of processing techniques described herein. Computer system 202 can be in communication with TDR 170, e.g., according to any currently-known or later developed solution for communicating between data repositories (e.g., TDR 170), computer systems (e.g., computer system 202), and/or other data repositories discussed herein.

An ORC simulator 178 can be communicatively coupled to TDR 170 and predictive model 174 of computer system 202, e.g., to simulate how processing variances may affect manufactured circuits 160. Although ORC simulator 178 is shown by example to be a distinct device and/or component with respect to computer system 202, it is understood that ORC simulator 178 may be included as part of computer system 202 in various embodiments. ORC simulator 178 can use IC layouts 100 and/or related data 172 to generate one or more conditions and add the variously generated conditions to ORC libraries 180, e.g., simulated aerial images of circuits to be manufactured from IC layout(s) 100. ORC libraries 180 can embed various forms of data in the simulated images, e.g., to identify portions of proposed IC layout 100 which may be particularly sensitive to processing variations, e.g., light intensity, image contrast at edges, etc. More specifically, some portions of proposed IC layout 100 may be prone to pinching (i.e., reduced pattern widths affecting circuit operation), bridging (i.e., inadvertent electrical connection between patterns caused by expanded widths and/or reduced separation distance) or other defects as a result of processing variations. Embodiments of the disclosure can use and/or adjust ORC libraries 180 to better identify process-sensitive geometries (PSGs) in each proposed IC layout 100, and iteratively adjust predictive model 174 to incorporate new data in TDR 170.

Figure 2:
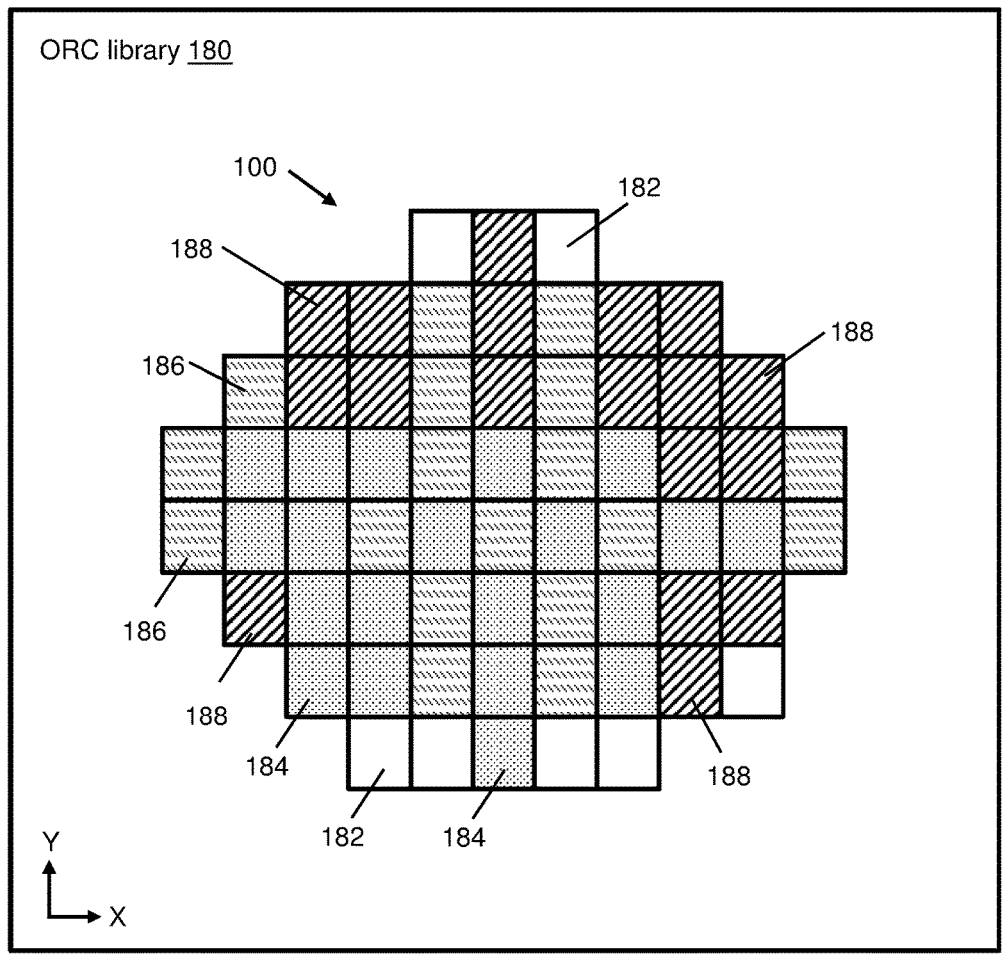
FIG. 2 depicts an example of an ORC library for a proposed IC layout according to embodiments of the disclosure.

Referring to FIG. 2, an ORC library 180 generated by ORC simulator 178 (FIG. 1) in embodiments of the disclosure is shown. ORC library 180, upon being generated, can be stored locally in ORC simulator 178 and/or transmitted to TDR 170 for storage thereon. As described elsewhere herein, embodiments of the disclosure can allow computer system 202 (FIG. 1) and ORC simulator 178 to generate ORC libraries 180 which more accurately capture the properties of proposed IC layout 100 and manufactured circuits 160 (FIG. 1) created from proposed IC layout 100 (FIG. 1). As shown, ORC library 180 can provide a simulated aerial view of proposed IC layout 100, e.g., in plane X-Y, to predict whether portions of proposed IC layout 100 are susceptible to processing variations during manufacture. Proposed IC layout 100 can represent an entire product, with each pattern 102, 104 to be manufactured included therein. Although ORC library 180 is shown within plane X-Y in FIG. 2, it is understood that ORC library 180 can model multiple layers of a particular layout and/or may depict proposed IC layout 100 in a different two-dimensional plane and/or in three-dimensional space.

ORC library 180 can be subdivided into multiple regions 182 representing portions of proposed IC layout 100 and corresponding patterns (e.g., patterns 102, 104 (FIG. 1)). Thus, each region 182 of ORC library 180 can include any conceivable number of patterns 102, 104 to be analyzed under different processing variations. When constructing ORC library 180, ORC simulator 178 can calculate, determine, and/or otherwise obtain a group of processing constraints pertaining to proposed IC layout 100 and/or each region 182 therein. The various processing constraints can include proposed threshold values, minimum and maximum qualifications for non-sensitivity, analytical techniques, etc., for defining various limits for pattern 102, 104 of proposed IC layout 100 during manufacture. For example, ORC simulator 178 can define a minimum pattern width, a minimum separation distance between patterns (simply "minimum pattern separation" hereafter), a minimum surface area of patterns within a given surface area (simply "pattern density" hereafter), and/or a minimum amount of space between device layers (simply inter-layer size hereafter) mask error enhancement factor, normalize image log slope, etch bias, CMP caused variance, topography caused effect.

The usefulness of ORC library 180 can be directly dependent upon the processing constraints for particular IC layouts 100, the reference data (e.g., simulated circuits and/or actual products) used to predict whether patterns 102, 104 in each region 182 are likely to violate the processing constraints under different processing conditions. Embodiments of the present disclosure can improve the methodology for defining processing constraints in view of various forms of reference data, e.g., training data, when constructing ORC library 180. ORC library 180 can predict whether regions 182 and any patterns 102, 104 are susceptible to process variations based on whether any processing constraints are violated during a simulated circuit manufacture. To this extent, ORC library 180 can compile the results of simulated circuit manufacture under different process variations, e.g., increased light intensity, reduced light intensity, varied edge contrast of manufacturing devices, post etch simulation, post CMP simulation, varied amounts of focus and/or other processing characteristics, etc. ORC library 180 can apply simulated and actual data to each region 182 in ORC library 180 to determine whether varied (i.e., non-ideal) processing conditions will pose a risk of violating the predetermined processing constraints. Each form of data used to test regions 182 in ORC library 180 can be verified with structural image representations of actual manufactured products, e.g., lithography scanning electron microscope (SEM) images, etch SEM images, electrical testing, etc. As proposed IC layout 100 and/or other layouts and products undergo successive testing, it is possible for a manufacturer to identify new process variations, issues, etc. In such cases, the new issues and training datasets can be added to ORC library 180 to better evaluate each region 182. Further, such data can be used to train predictive model 174 to calculate appropriate processing constraints for use within ORC library 180.

It is therefore understood that ORC library 180 can, for a single region 182, simultaneously evaluate processing under maximum light intensity, minimum light intensity, focus, variants caused from different types of etching and/or processing, etc., to mathematically predict whether each region 182 is sensitive to such variations during manufacture. ORC library 180 can deem some regions as being non-sensitive regions 184, e.g., due to the actual and simulated processing variations causing no significant change to the manufacture of patterns 102, 104 formed in those regions. Other regions 182 may have greater sensitivity to the various processing variations simulated or shown in training data for ORC library 180. ORC library 180 can optionally designate other regions 182 of proposed IC layout as being minimally sensitive regions 186, e.g., by including geometries which form with significant variations under different processing conditions, yet pose little risk of violating the previously-calculated processing constraints for IC layout 100. The amount of risk can correspond to, e.g., a percentage of manufactured or simulated circuits which violate the processing constraints for a product and may include, e.g., a maximum of five percent, ten percent, twenty percent, etc., of all test cases. ORC library 180 may also include regions 182 determined to include process-sensitive geometries (PSGs), and thus may identify a set of PSG regions 188. PSG regions 188 of ORC library 180 represent regions which are likely to violate the previously calculated processing constraints under the different processing variations, and are likely to cause operational errors and/or variations from pinching, bridging, and/or other misprinting events. Thus, regardless of how many simulated or actual test cases are used to test each region 182 in ORC library 180, the usefulness of ORC library 180 will be limited in cases where the processing constraints have been miscalculated and/or do not fully correspond to the actual characteristics of proposed IC layout 100.

Referring to FIGS. 1 and 2 together, computer system 202 is configured to calculate, recalculate, and/or otherwise update the processing constraints applied by ORC simulator 178, e.g., by constructing, training, and/or applying predictive model 174. Predictive model 174 can be operable to calculate processing constraints for ORC simulator 178 and ORC library 180, e.g., by processing data from ORC libraries 180 for proposed IC layout 100 and/or different IC layouts. Predictive model 174 can thereafter predict PSGs in proposed IC layout 100 by identifying actual and/or likely violations to the set of processing constraints in ORC library 180 constructed for the currently proposed IC layout 100. Manufacturing device 150 can thereafter produce manufactured circuit 160 based on proposed IC layout 100. In cases where ORC library 180 correctly predicted PSGs in manufactured circuit 160, predictive model 174 can flag ORC library 180 as correctly predicting the characteristics of manufactured circuit 160. In cases where ORC library 180 incorrectly predicted PSGs in manufactured circuit 160, predictive model 174 can flag ORC library 180 as incorrectly predicting the characteristics of manufactured circuit 160, in addition to adjusting or more predictive algorithms for generating the various processing constraints (e.g., based on the properties of manufactured circuit 160). These processes, in addition to additional and/or optional processes described herein, can train predictive model 174 to continuously improve the quality of ORC libraries 180 produced with ORC simulator 178. In this manner, computer system 202 can provide a process methodology for automatically adjusting the calculation of processing constraints for ORC libraries 180 without manual analysis and/or decisions by a user.

Using Predictive Model to Predict PSGs in IC Layout

Figure 3:
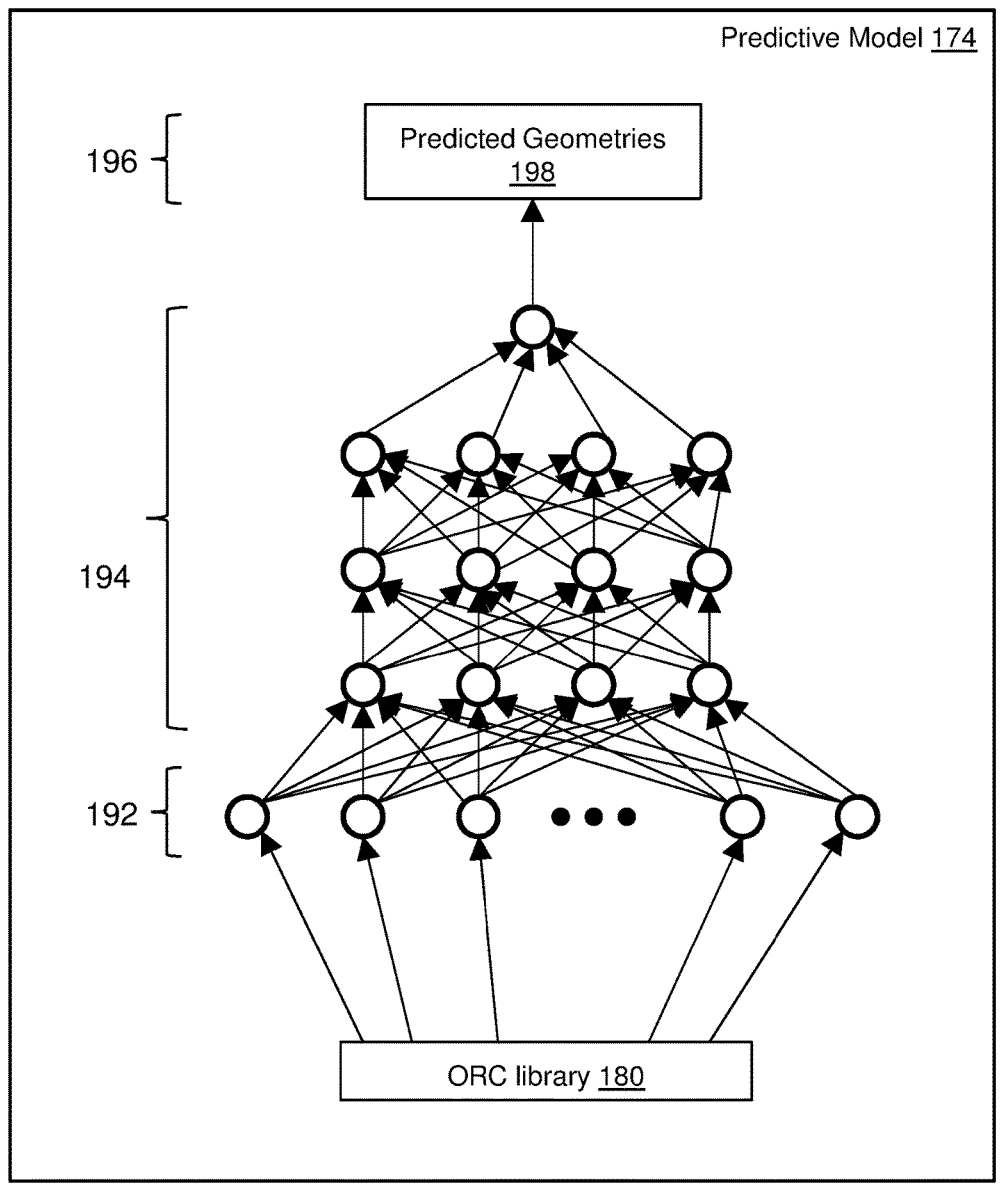
FIG. 3 provides a schematic process diagram illustrating a method of using an ANN to predict process-sensitive geometries in an IC layout according to embodiments of the disclosure.

Turning to FIG. 3, a schematic diagram illustrating predictive model 174 is shown to further illustrate processes for predicting PSGs in proposed IC layout 100 according to the disclosure. Predictive model 174 can relate one or more input variables (e.g., ORC library 180) to predictions of whether various patterns 102, 104 of proposed IC layout 100 depicted in ORC library 180 will include PSGs. As ORC libraries 180 are submitted to predictive model 174, algorithms included in predictive model 174 can be iteratively adjusted based on comparing various outputs (e.g., predictions for patterns 102, 104 in proposed IC layout 100) to verified, ideal values and/or other related groups of inputs and outputs (e.g., printed patterns 162, 164 of manufactured circuit(s) 160). Inputs 192 denote a group of inputs provided to predictive model 174 which can include, e.g., various conditions in the ORC library 180 produced with ORC simulator 178 and/or TDR 170. Inputs 192 can together define an input layer of predictive model 174 represented by multiple nodes. Each node and respective input 192 can in turn be connected to other nodes in a hidden layer 194, which represent particular mathematical functions. In embodiments of the present disclosure, inputs 192 can include, e.g., the ORC libraries 180 corresponding to patterns 102, 104 included in proposed IC layout 100 and/or other IC layouts. Each node of hidden layer 194 can include a corresponding weight representing a factor or other mathematical adjustment for converting input variables into output variables. The nodes of hidden layer 194 can eventually connect to at least one output node 196 from predictive model 174, which predicts the presence of PSG regions 188 in IC layout 100 based on inputs 192. In embodiments of the disclosure, output 196 from predictive model 174 can include determining whether a particular region 182 is process sensitive, e.g., may be classified as a PSG region 188 based on inputs 192.

To increase the effectiveness of its predictions, predictive model 174 can compare outputs 196 with predetermined or target (e.g., ideal) values, e.g., from manufactured circuit(s) 160, to calculate errors in a process known as "error back-propagation." Such errors may include, e.g., geometries in ORC library 180 being improperly classified as being PSGs 188 or not being PSGs 188. Where the error between various outputs 196 and a predetermined value exceeds a particular threshold, predictive model 174 can include processes for self-correction. For example, process steps encoded in hardware and/or software can use outputs 196 to adjust weights W of hidden layer 194 and or connections between inputs 192 to and hidden layer 194. In an example embodiment, error back propagation can include "Bayesian Regulation," a series of mathematical steps leveraging probability for weight calculations in order to minimize the mean squared error (MSE) (i.e., the squared value of the difference between an output and a predetermined value, whether positive or negative) between values of output(s) 196 and the predetermined values. Bayesian Regulation can help generalize the various mathematical models in predictive model 174 to avoid over fitting experimental data to a particular situation. Thus, predictive model 174 can develop and adjust underlying algorithms, equations, connections, sub-models, etc., therein by processing multiple inputs 192 to calculate outputs 196 and compare outputs 196 to predetermined or expected values.

Predictive model 174 can take the form of an artificial neural network (ANN), and more specifically can include one or more sub-classifications of ANN architectures, whether currently-known or later developed. In one example, predictive model 174 can take the form of a "convolutional neural network," for predicting PSGs (e.g., through predicted geometries 198) from base images (e.g., patterns 102, 104 in proposed IC layout 100, and/or ORC libraries 180). Convolutional neural networks may be distinguished from other neural network models, e.g., by including individual nodes in each layer which respond to inputs in a restricted region of a simulated space known as "a receptive field." The receptive fields of different nodes and/or layers can partially overlap such that they together form a tiled depiction of a visual field (e.g., ORC libraries 180 in two-dimensional space). The response of an individual node to inputs within its receptive field can be approximated mathematically by a convolution operation. In another example, predictive model 174 can take the form of a multilayer perceptron (MLP) neural network. MLP neural networks may be distinguished from other neural networks, e.g., by mapping sets of input data onto corresponding sets of outputs by way of a directed graph. MLP neural networks can rely upon automatic supervised learning, e.g., through one or more backpropagation processes described herein. MLP neural networks may be particularly suitable for sets of data which may be not linearly separable by conventional mathematical techniques. Regardless of the chosen architecture of predictive model 174, the various processes for training predictive model 174 and/or expanding the information included in TDR 170 implemented with embodiments of the present disclosure can be similar or identical.

Computer System and Example Components

Figure 4:
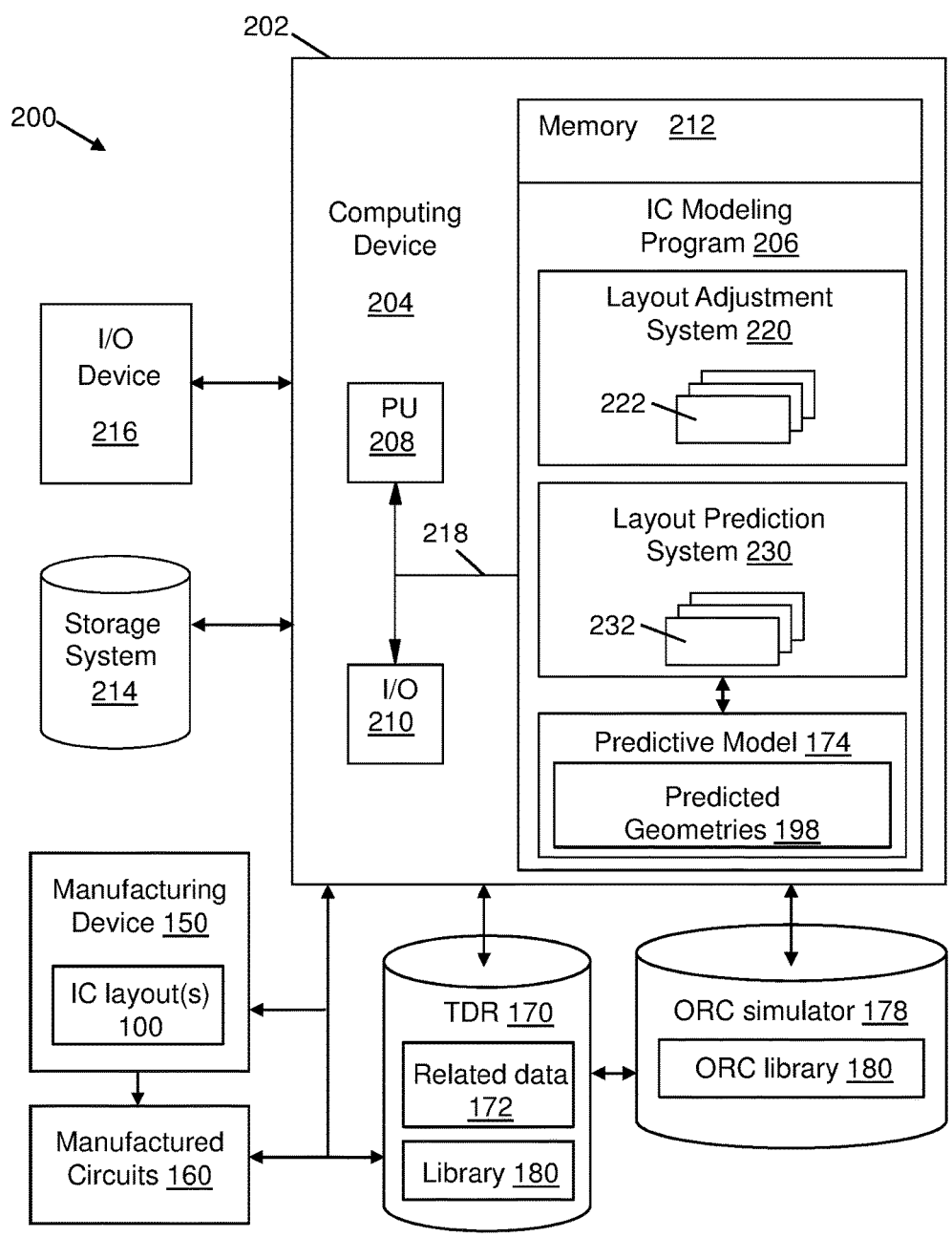
FIG. 4 depicts an illustrative environment, which includes a computer system configured to interact with a manufacturing device, training data repository, and ORC simulator to predict process-sensitive geometries in an IC layout according to embodiments of the disclosure.

Turning now to FIG. 4 an illustrative environment 200 for implementing the methods and/or systems described herein is shown. In particular, a computer system 202 is shown as including a computing device 204. Computing device 204 can include, e.g., an IC modeling program 206 which may include, e.g., one or more sub-systems (layout adjustment system 220 and/or layout prediction system 230 described herein) for performing any/all of the processes described herein and implementing any/all of the embodiments described herein.

Computer system 202 is shown including a processing unit (PU) 208 (e.g., one or more processors), an I/O component 210, a memory 212 (e.g., a storage hierarchy), an external storage system 214, an input/output (I/O) device 216 (e.g., one or more I/O interfaces and/or devices), and a communications pathway 218. In general, processing unit 208 can execute program code, such as IC modeling program 206, which is at least partially fixed in memory 212. While executing program code, processing unit 208 can process data, which can result in reading and/or writing data from/to memory 212 and/or storage system 214. Pathway 218 provides a communications link between each of the components in environment 200. I/O component 210 can comprise one or more human I/O devices, which enable a human user to interact with computer system 202 and/or one or more communications devices to enable a system user to communicate with the computer system 202 using any type of communications link. To this extent, IC modeling program 206 can manage a set of interfaces (e.g., graphical user interface(s), application program interface(s), etc.) that enable system users to interact with IC modeling program 206. Further, IC modeling program 206 can manage (e.g., store, retrieve, create, manipulate, organize, present, etc.) data, through several modules contained within a layout adjustment system 220 (i.e., modules 222) and/or a layout prediction system 230 (i.e., modules 232). Layout adjustment system 220 and layout prediction system 230 are shown by example as being sub-systems of IC modeling program 206. However, it is understood that layout adjustment system 220 and layout prediction system 230 may be wholly independent systems. Memory 212 of computing device 204 is also shown to include predictive model 174, though it is understood that predictive model 174 may be included within one or more independent computing devices, programs, etc., in alternative embodiments.

As noted herein, IC modeling program 206 can include layout adjustment system 220 and layout prediction system 230. In this case, various modules 222 of layout adjustment system 220 and modules 232 of layout prediction system 230 can enable computer system 202 to perform a set of tasks used by IC modeling program 206, and can be separately developed and/or implemented apart from other portions of IC modeling program 206. Memory 212 can thus include various software modules 222, 232 of systems 220, 230 configured to perform different actions. Example modules can include, e.g., a comparator, a calculator, a determinator, etc. One or more modules 222, 232 can use algorithm-based calculations, look up tables, software code, and/or similar tools stored in memory 212 for processing, analyzing, and operating on data to perform their respective functions. Each module discussed herein can obtain and/or operate on data from exterior components, units, systems, etc., or from memory 212 of computing device 204.

Sets of modules 222, 232 of layout adjustment system 220 and layout prediction system 230 are shown to illustrate operation of computer system 202 according to various examples. Layout adjustment system 220 can include, e.g., modules 222 for building and modifying IC layouts 100 provided to manufacturing device 105 to produce manufactured circuits 160. In addition or as an alternative to proposed IC layout 100, layout adjustment system 220 can generate a database expressed, e.g., through a list, graphical representation, and/or other organizational structure of each pattern 102 (FIG. 1) in proposed IC layout(s) 102. Layout adjustment system 220 can construct and/or modify various components simulated in proposed IC layout 100 and/or related data 172. In addition, layout adjustment system 220 can quantify one or more metrics for each pattern (e.g., length, width, surface area, printability, etc.) in proposed IC layout 100 and/or related data 172. In further embodiments, layout adjustment system 220 can produce various outputs (e.g., newly constructed or adjusted form of proposed IC layouts 100) based on predictions by layout prediction system 230, related data 172, ORC libraries 180, etc. Such inputs can be provided to computing device 204, e.g., through I/O device 216. Some attributes of proposed IC layout 100 can be converted into a data representation (e.g., a data matrix with several values corresponding to particular attributes) and stored electronically, e.g., within memory 212 of computing device 204, storage system 214, and/or any other type of data cache in communication with computing device 204. Images and/or other representations of proposed IC layout 100, manufactured circuit 160, etc., can additionally or alternatively be converted into data inputs or other inputs to IC modeling program 206 with various scanning or extracting devices, connections to independent systems (e.g., ORC simulator 178), and/or manual entry of a user. As an example, e.g., ORC simulator 178 and/or a user of computing device 204 can submit ORC libraries 180, constructed from proposed IC layout 100 to layout prediction system 230. Layout prediction system 230 can then apply predictive model 174 to predict where PSGs may appear in circuits manufactured from proposed IC layout 100. Manufacturing device 150 (e.g., as a result of instructions by IC modeling program 206), can create manufactured circuit(s) 160 from proposed IC layout 100. TDR 170 and/or IC modeling program 206 can thereafter receive related data 172 as a further input, and layout prediction system 230 can determine whether it correctly predicted the position, number, etc., of PSGs in manufactured circuit 160.

As discussed herein, IC modeling program 206, including predictive model 174, can create new or adjusted proposed IC layouts 100 based on repeated analysis of proposed IC layouts, ORC libraries 180, and related data 172 of manufactured circuits 160. As described elsewhere herein predictive model 174 can include multiple layers of models, calculations, etc., each including one or more adjustable calculations, logical determinations, etc., through any currently-known or later developed analytical technique for predicting an outcome based on raw data. Predictive model 174 can therefore use related data 172, ORC libraries 180, and/or various other data in TDR 170 and/or memory 212 as an input to further adjust predictive model 174 as discussed herein. Example processes executed with predictive model 174 and/or IC modeling program 206 are discussed in detail elsewhere herein. Modules 222 of layout adjustment system 220 and modules 232 of layout prediction system 230 can implement one or more mathematical calculations and/or processes, e.g., to execute the machining learning and/or analysis functions of predictive model 174.

Layout prediction system 230 can include a corresponding set of modules 232 for executing functions of IC modeling program 206, discussed herein. Modules 232 of layout prediction system 230 can include, e.g., a determinator for making logical determinations based on one or more inputs. Modules 232 of layout prediction system 230 can perform one or more actions relating to the training of predictive model 174, e.g., submitting data from TDR 170, IC layouts 100, and/or memory 212 to expand the amount of reference data used by predictive model 174. Other functions of modules 232 can include, e.g., translating patterns 102 (FIGS. 1, 3-4) and/or usefulness maps (FIGS. 2-4) along X-axis or Y-axis to create additional training data for predictive model 174. Layout prediction system 230 can include modules 232 for "flagging" (e.g., marking, indexing, and/or otherwise identifying in data) various ORC libraries 180 in TDR 170, e.g., to indicate whether various ORC libraries 180 produced with ORC simulator 178 correctly predicted PSGs corresponding to actual PSGs in manufactured circuits 160. Modules 232 of layout prediction system 230, in addition, can modify predictive model 174 by adjusting variables, coefficients, weights threshold values, reference values, etc., based on various information in TDR 170 and/or memory 216. Modules 232 of layout prediction system 230 can also include a calculator for carrying out various mathematical operations, e.g., to adjust predictive model 174 as prescribed by other processes. In other embodiments, modules 232 of layout prediction system 230 may be used to adjust predictive model 174.

Computer system 202 can be operatively connected to or otherwise in communication with manufacturing device 150 having one or more OPC-based manufacture tools, e.g., an OPC modelor, as part of the layout adjustment system 220 for converting proposed IC layouts 100 into instructions used by manufacturing device 150 to create manufactured circuit(s) 160. Computer system 202 can thus be embodied as a unitary device in a semiconductor manufacturing plant coupled to, manufacturing device 150 and/or other devices, or can be multiple devices each operatively connected together to form computer system 202. Embodiments of the present disclosure can thereby include using predictive model 174 to predict (based on ORC libraries 180) where PSGs will appear in manufactured circuits 160 formed from proposed IC layouts 100, determining whether the prediction is correct based on related data 172 for manufactured circuits 160, and thereafter flagging each proposed IC layout 100 as being correctly or incorrectly predicted. In cases where proposed IC layout 100 is not correctly predicted, layout prediction system 230 can adjust predictive model 174, e.g., based on the discrepancies between predicted and actual PSGs. As discussed herein, embodiments of the present disclosure thereby provide machine learning processes for automatically adjusting predictive model 174 and/or proposed IC layouts 100 to correctly identify the location of PSGs in manufactured circuits 160 produced by manufacturing device 150.

Where computer system 202 comprises multiple computing devices, each computing device may have only a portion of IC modeling program 206, layout adjustment system 220, and/or layout prediction system 230 fixed thereon (e.g., one or more modules 222, 232). However, it is understood that computer system 202 and layout adjustment system 220 are only representative of various possible equivalent computer systems that may perform a process described herein. Computer system 202 can obtain or provide data, such as data stored in memory 212 or storage system 214, using any solution. For example, computer system 202 can generate and/or be used to generate data from one or more data stores, receive data from another system, send data to another system, etc.

Operational Methodology

Figure 5:
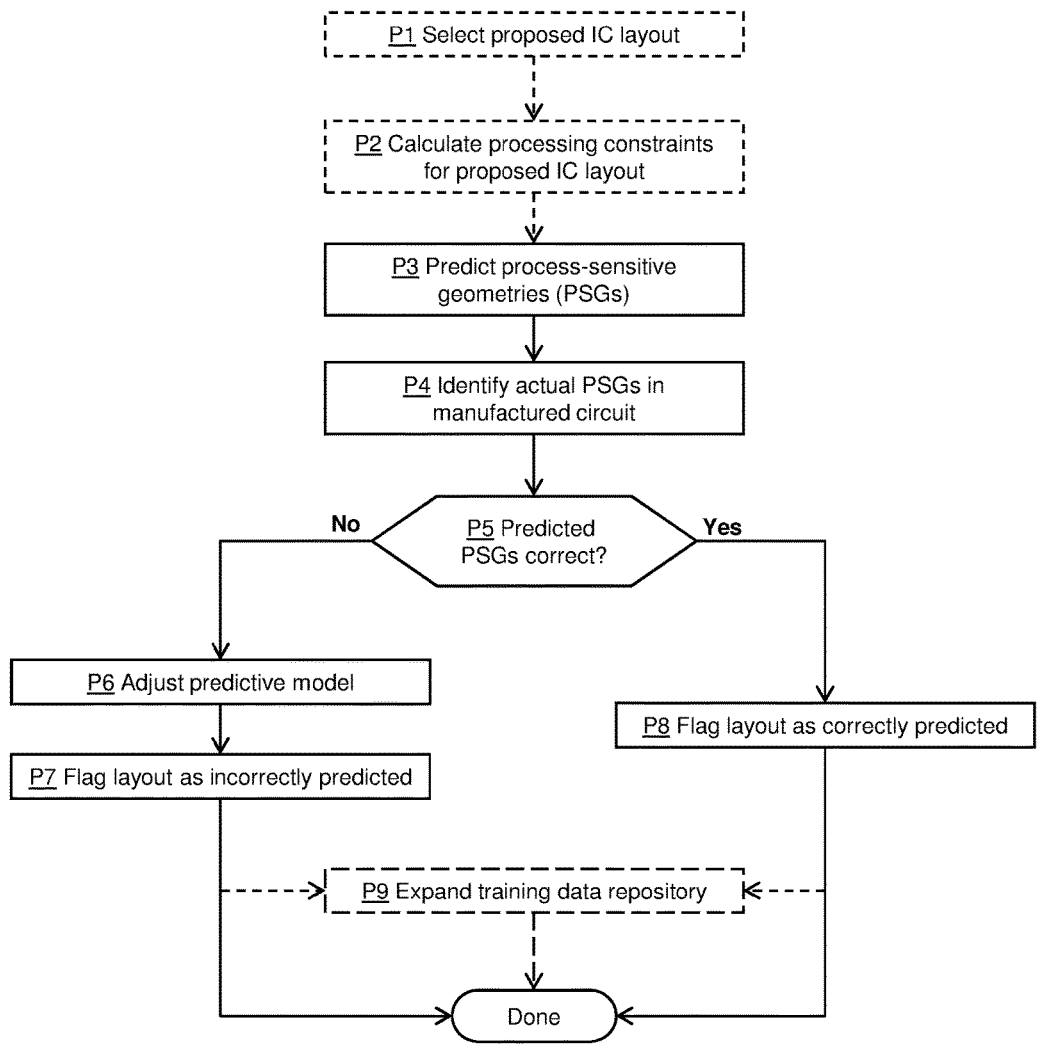
FIG. 5 is an example flow diagram of a method for predicting process-sensitive geometries according to embodiments of the disclosure.

Referring to FIGS. 1, 4-5 together, processes for predicting PSGs (e.g., size, location, etc.) in circuits manufactured from one or more proposed IC layouts 100 are discussed. The steps and processes depicted in FIG. 5 can be implemented, e.g., with one or more modules 222 of layout adjustment system 220, modules 232 of layout prediction system 230, predictive model 174 and/or other components of computer system 202 described herein by example. A single and/or repeated execution of the processes discussed herein can yield a machine learning process for predicting PSGs in manufactured circuits 160 and adjusting predictive model 174, e.g., to account for discrepancies between predicted PSGs and actual PSGs. In this manner, circuit designers may adjust future proposed IC layouts 100 to account for the location of various PSGs, and/or expand the amount of data in TDR 170, as discussed herein. In the example processes discussed herein, proposed IC layout 100 will generally be described as including at least two patterns 102, 104 therein, with some alternative examples referring to proposed IC layouts with different numbers of patterns (e.g., one pattern, four patterns, ten patterns, etc.). It is also understood that the present disclosure can be implemented with respect to multiple proposed IC layouts 100 simultaneously and/or sequentially, with each proposed IC layout including patterns 102, 104 with any conceivable dimensions, in any conceivable number, etc., and that other examples are discussed herein where appropriate. The various processes discussed herein, furthermore, can be implemented before, after, or during OPC implementation on one or more proposed IC layouts 100 and/or manufactured circuits 160. It is also understood that one TDR 170 can be used for multiple proposed IC layouts 100 in embodiments of the disclosure, that multiple TDRs 170 and/or predictive models 174 can be used for one proposed IC layout 100, and/or other embodiments may include further combinations of IC layouts 100, TDRs 170, predictive models 174, etc.

In a preliminary action, IC modeling program 206 or a user thereof can optionally select one or more proposed IC layouts 100 for manufacturing circuit structures as described herein. Process P1 is shown in phantom to illustrate this optional process according to embodiments. Each proposed IC layout 100 can include, e.g., patterns 102, 104 therein. Further processes described herein can automatically operate on proposed IC layout 100 selected in process P1. Proposed IC layout(s) 100 can be submitted to computer system 202, e.g., as inputs to I/O device 216 through a computer-readable storage medium and/or other computer-readable inputs to computer system 202.

Regardless of how proposed IC layout(s) 100 are selected, another preliminary process of methods according to the disclosure can include applying predictive model 174 to calculate, in process P2 a set of processing constraints for proposed IC layout 100. Process P2 is shown in phantom to demonstrate that the functions performed therein may be executed separately from the various processes according to the present disclosure, and/or may constitute an initial step completed before the various other processes described herein. The calculated processing constraints, as noted elsewhere herein, can be used to predict whether one or more patterns 102, 104 are likely to include PSGs, e.g., geometries which are susceptible to forming defects (e.g., pinching, bridging, etc.) under varied circuit manufacturing conditions. Embodiments of the disclosure can provide a machine learning technique for training a predictive model 174 to generate revised processing constraints based on the characteristics of each proposed IC layout 100 and/or ORC libraries 180 for other proposed IC layouts 100 and/or previously manufactured circuits 160. To this extent, calculating processing constraints for proposed IC layout 100 can include setting various threshold values for various patterns 102, 104 and/or portions thereof in proposed IC layout 100. One example processing constraint can include, e.g., a minimum pattern width of each patterns 102, 104, such that predictive model 174 will predict pattern(s), 102, 104 as including PSGs if proposed IC layout 100 includes patterns 102, 104 with a width (e.g., widths $W_1$) less than a predetermined minimum pattern width. Another example processing constraint can include, e.g., a minimum pattern separation (e.g., value of $D_{S1}$) between adjacent patterns 102, 104, such that predictive model 174 will predict pattern(s), 102, 104 as including PSGs if proposed IC layout 100 includes patterns 102, 104 which are separated by less than a predetermined minimum pattern separation. In addition to predetermined widths and amounts of pattern separation, processing constraints for proposed IC layout 100 determined in process P2 can include, e.g., a minimum or maximum pattern density (i.e., the amount or percentage of surface area in plane X-Y occupied by patterns 102, 104), a minimum or maximum inter-layer size (e.g., distance between vertically adjacent layers in a structure), and/or other quantities related to the size and position of one or more patterns 102, 104 in proposed IC layout 100.

Regardless of which processing constraints are selected and calculated in process P2, the calculating can be dependent upon parameters included in TDR 170, e.g., related data 172 and/or ORC libraries 180 of proposed IC layout 100 and/or other IC layouts. In particular, predictive model 174 can calculate various processing constraints in process P2 by reference to ORC libraries 180 for other proposed IC layouts 100. For example, a calculator of modules 232 can compare various patterns 102, 104 in proposed IC layout 100 with similar or different patterns in ORC libraries 180, which may have been determined to be PSGs or non-sensitive geometries. In addition or alternatively, a comparator of modules 232 can compare predictions by other ORC libraries 180 to corresponding related data 172 for the same proposed IC layout 100, e.g., to determine whether the predictions by ORC library 180 approximate the sensitivity of certain patterns 102, 104 to processing variations. The raw data used for calculating processing constraints in process P2 may be wholly included in TDR 170, while the various mathematical models and logic for calculating processing constraints from this data may be included as part of predictive model 174. It is also understood that the referenced data in TDR 170 may have been produced, e.g., as artificial examples to train predictive model 174, or may be provided by other computer systems 202 and/or predictive models 174 in communication with the same TDR 170.

Regardless of the relevant processing constraints and/or techniques for calculating such constraints, embodiments of the disclosure can begin at process P3 of predicting which patterns 102, 104 of proposed IC layout 100 include PSGs therein. Modules 232 of layout prediction system 230 can predict whether proposed IC layout 100 includes PSGs therein, e.g., by comparing various patterns 102, 104 in proposed IC layout 100 with the processing constraints calculated by predictive model 174 in process P2. Predictive model 174 can thus accept ORC simulations under various conditions and related data for proposed IC layout 100 to predict whether one or more patterns may violate the processing constraints calculated in process P1. To this extent, modules 232 of layout prediction system 230 can include a calculator for calculating various physical attributes of each pattern 102, 104 in proposed IC layout 100, e.g., width, separation distance, pattern density, inter-layer size, etc. A comparator of modules 232 of layout prediction system 230 can then determine whether any of the calculated physical attributes violate (e.g., exceed maximum or threshold values, fail to satisfy one or more minimum values, positioned inside or inside a predetermined range of values, etc.) the processing constraints calculated in process P2. Layout prediction system 230 can then identify specific patterns 102, 104 or portions thereof in proposed IC layout 100 as being PSGs which may pose a risk of manufacturing errors under one or more process variations.

The flow can thereafter proceed to process P4, in which IC modeling program 206 identifies actual PSGs in one or more manufactured circuits 160 produced with manufacturing device 150. In some cases, process P4 can include using manufacturing device 150 to yield manufactured circuits 160 based on proposed IC layouts 100. In other cases, process P4 of identifying the actual PSGs can include capturing one or more related data 172 depicting manufactured circuit(s) 160. Related data 172 can be used in further processes to determine whether layout prediction system 230 correctly predicted which patterns 102, 104 may include PSGs in proposed IC layout 100 and/or to further train predictive model 174.

The flow can then proceed to process P5, e.g., in which layout prediction system 230 determines whether the PSGs predicted in process P3 correspond to PSGs in manufactured circuit 160. In this context, an actual PSG "corresponding" to a predicted PSG can include an exact match between one or more PSGs, and/or can include other instances. In particular, a calculator of modules 232 can set margins of error for the width, separation distance, pattern density, etc., of printed patterns 162, 164 in manufactured circuit 160 to define a minimum level of accuracy for each prediction. The desired level of accuracy can vary between manufacturers, circuit designs, and/or other factors and thus can be set manually by a user and/or automatically by calculating and determining algorithms included in layout prediction system 230. In addition, the properties of manufactured circuit 160 used for comparing in process P5 may not be indicative of a single product unit, but may variously include multiple manufactured circuits 160 produced from a single proposed IC layout 100 to account for process variations, with various statistical analyses being applied to determine where actual PSGs exist in manufactured circuit(s) 160.

In situations the actual PSGs in manufactured circuit 160 do not correspond to the predicted PSGs in proposed IC layout 100 (i.e., "No" at process P5), the flow can proceed to processes P6 and P7 for training predictive model 174 to correct discrepancies between predicted and actual PSGs in manufactured circuit(s) 160. At process P6, modules 232 of layout prediction system 230 can calculate and submit a set of corrective adjustments to predictive model 174. Such adjustments generally can include changes to the mathematical models and/or process steps for calculating processing constraints and/or predicting PSGs in proposed IC layouts 100 as described herein. According to specific examples, adjusting predictive model 174 in process P6 can include adding one or more related sets of ORC data to TDR 170 for use in subsequent processes and/or predictions, deleting abnormal data or related data which reduces the accuracy of results, and/or other adjustments to TDR 170. Adjusting predictive model 174 can also include, e.g., adding patterns that is critical to new issues, or remove patterns that is not important and easy to cause data overfitting issues; increasing or decreasing the value of various coefficients, e.g., by retraining predictive model 174 with the most recently updated form of TDR 170, adjusting mathematical processes and/or models for relating attributes of proposed IC layout 100 to manufacturing sensitivities, changing the control logic and steps for analytically diagnosing particular patterns 102, 104 in proposed IC layout 100, etc. In any case, the amount and type of adjusting applied to predictive model 174 can be related to the type of error, the amount of error, various attributes of actual PSGs in manufactured circuits 160, etc. The flow can then proceed to process P7, e.g., in which layout prediction system 230 flags proposed IC layout 100 and its corresponding manufactured circuit(s) 160, related data 172, ORC libraries 180, etc., in TDR 170 as being incorrectly predicted. The flagging in process P7 can similarly be applied to any corrections or adjustments to predictive model 174 prescribed in process P6, e.g., for further correction or adjustment in cases where future IC layouts 100 are also incorrectly predicted.

In situations where the actual PSGs in manufactured circuit 160 correspond to the predicted PSGs in proposed IC layout 100 (i.e., "Yes" at process P5), the flow can proceed to process P8, e.g., in which the correct prediction is flagged and used for reference in further training of predictive model 174. In particular, modules 232 of layout prediction system 230 can flag proposed IC layout 100 and its corresponding manufactured circuit(s) 160, related data 172, ORC libraries 180, etc., as being correctly predicted in cases where a threshold number (e.g., a percentage up to approximately one-hundred percent) of PSGs in manufactured circuit(s) 160 correspond to the predicted PSGs. In this case, process P8 can also include adding proposed IC layout 100 and its corresponding manufactured circuit(s) 160, related data 172, ORC libraries 180, to TDR 170 and/or memory 212 for use in future predictions, without the underlying calculations, logic, etc., of predictive model(s) 174 being changed. After proposed IC layout 100 is flagged in process P7 or process P8, the flow can conclude ("Done"), or proceed to an optional step P9 of expanding TDR 170 as discussed in detail elsewhere herein.

Figure 6:
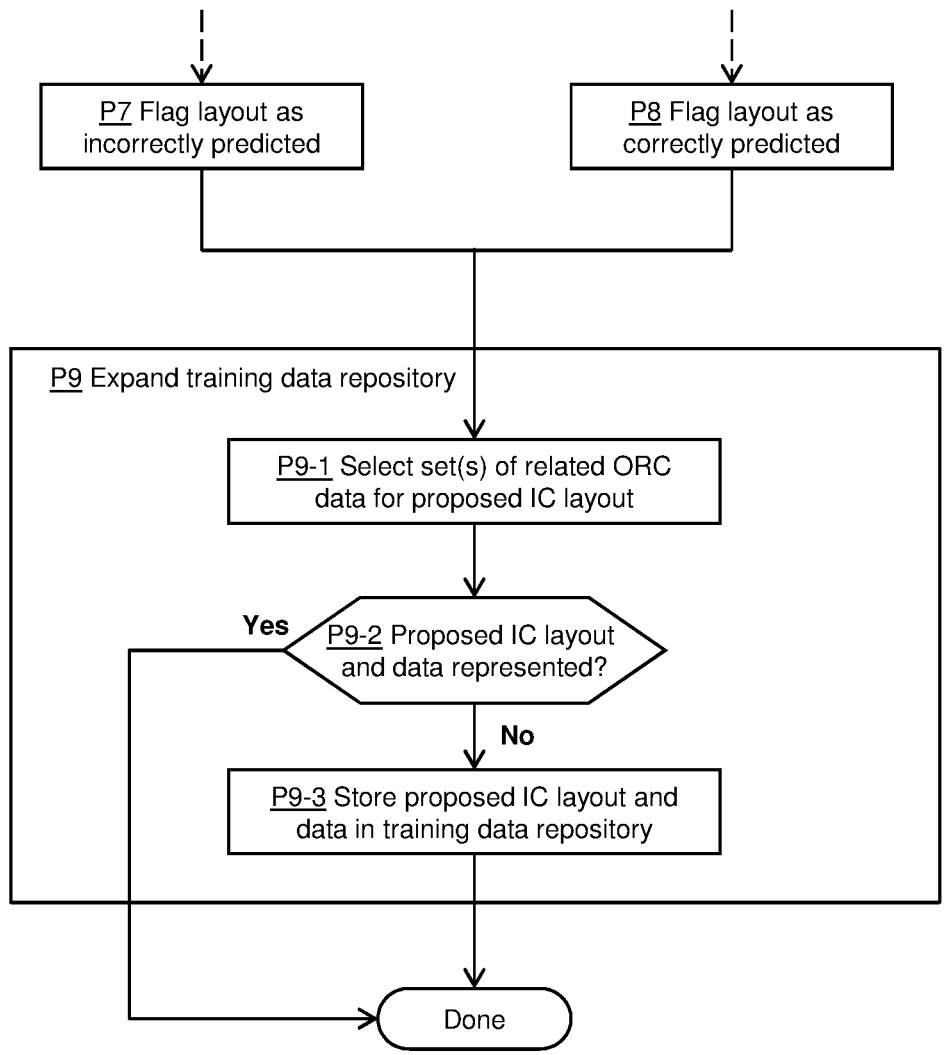
FIG. 6 is an example flow diagram of a method for expanding a training data repository according to embodiments of the disclosure.

Referring to FIGS. 1, 4-6 together, embodiments of the disclosure can optionally include additional actions for expanding TDR 170. FIG. 6 depicts process P9 of FIG. 5 with additional processes P9-1, P9-2, P9-3 of expanding data in TDR 170, e.g., after implementing various processes shown in FIG. 5 and described herein. It is understood that implementation of process P9 and one or more of its sub-processes can alternatively occur between other process steps and/or simultaneously with other process steps where desired or applicable. Process P9, as described herein, can automatically expand the size of TDR 170 to further train predictive model 174 by generating additional data to aid future predictions and/or calculating of processing constraints. The various sub-processes of P9, e.g., processes P9-1, P9-2, P9-3, can be implemented together, separately, and/or in a different order to accommodate user preference and/or various technical settings.

In process P9-1, modules 232 of layout prediction system 230 can store one or more sets of related ORC data 172 for manufactured circuit(s) 160 in TDR 170 to further train predictive model 174 and/or other predictive models 174 for use on other proposed IC layouts 100. To this extent, TDR 170 can include a field for storing, organizing, and/or interpreting various forms of related data for use with other proposed IC layouts 100. The storing of related data 172 can include, e.g., deriving additional ORC simulations and extract data from various ORC simulations and use them as the input data, and classification of whether the pattern is PSG as the output data. The classification or verification can be done with one or more tools for visually inspecting IC structures, such as a transmission electron microscope (TEM), scanning electron microscope (SEM), electric testing of certain circuits, and/or other currently-known or later developed tools. However obtained, related data 172 to be stored in TDR 170 can be submitted as an input to computer system 204 and/or can be captured directly by computer system 204 through various sub-systems or components included therein or operably connect thereto.

In various embodiments, it is understood that IC modeling program 206 can be implemented on a single proposed IC layout 100 multiple times, e.g., to iteratively predict, correct, and re-predict where PSGs will appear in manufactured circuits 160. In this case, IC modeling program 206 can include various patterns for storing duplicitous data in TDR 170 and/or disproportionately skewing the training data therein toward pattern of a single proposed IC layout 100. At process P9-2, a determinator of modules 232 can determine whether proposed IC layout 100 and/or related data 172 is already represented in TDR 170. Where proposed IC layout 100 or related data 172 has already been added to TDR 170 (i.e., "Yes" at process P9-2), the process flow can bypass process P9-3 and thereafter conclude ("Done") or proceed to other processes. This situation may occur, e.g., as a result of previously implementing methods according to the disclosure. In cases where proposed IC layout 100 is not represented in TDR 170 (i.e., "No" at process P9-2), the flow can proceed to process P9-3 of submitting proposed IC layout 100 and/or related data 172 to TDR 170 and, optionally, associated ORC libraries 180 and/or other depictions of patterns therein prior to manufacture with manufacturing device 150. The flow can then conclude ("Done") or proceed to other processes as discussed herein.

Figure 7:
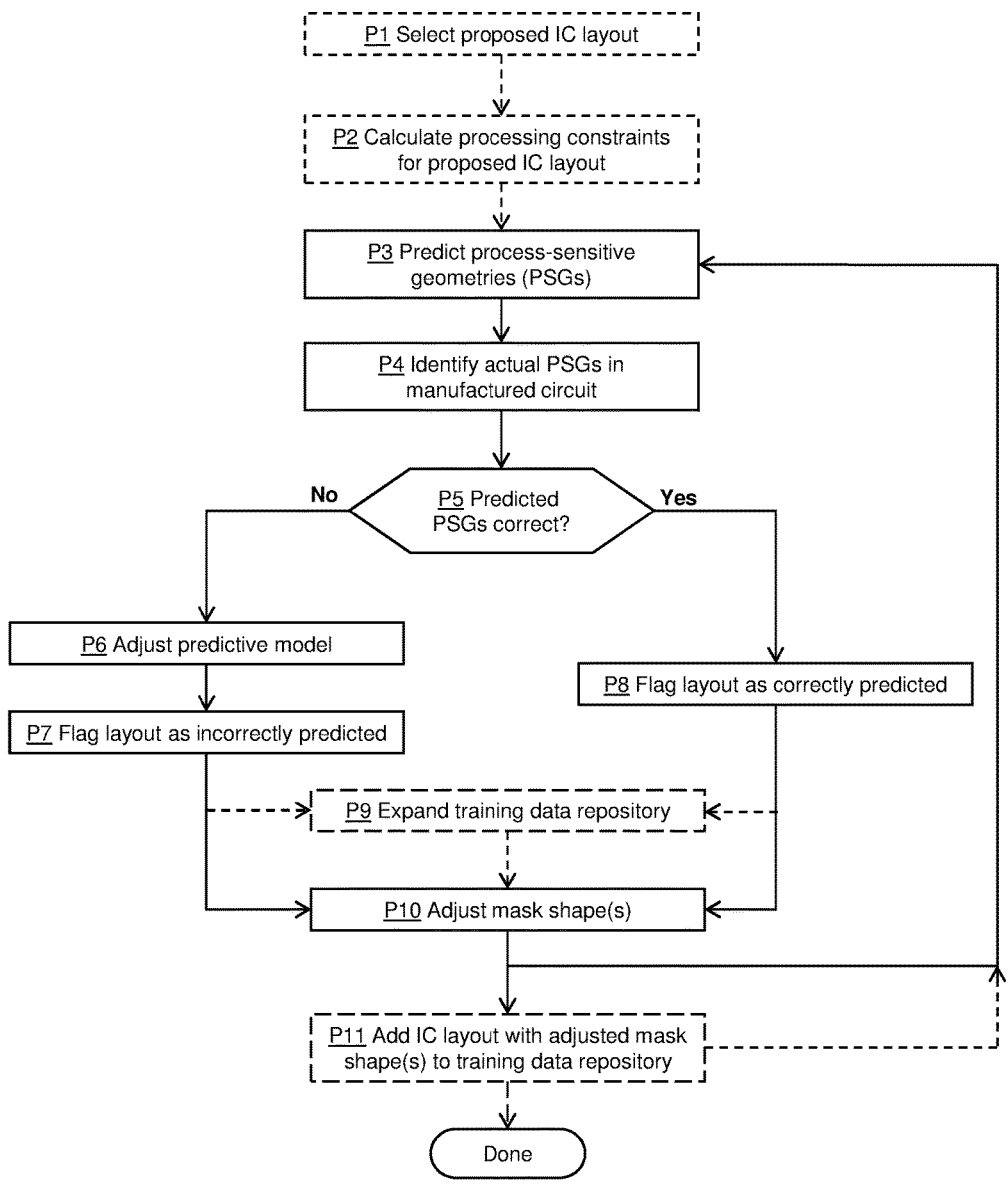
FIG. 7 is an example flow diagram of a method for predicting process-sensitive geometries according to further embodiments of the disclosure.

Referring to FIGS. 1, 4, and 7, embodiments of the disclosure can include actively adjusting proposed IC layouts 100 to account for PSGs in manufactured circuits 160. More specifically, the present disclosure is operable to automatically adjust various patterns 102, 104 in proposed IC layout 100 to remove PSGs and thus reduce the risk of errors from process sensitivity. The various processes discussed herein can, optionally, be executed in a looping fashion to repeatedly predict the location of PSGs in manufactured circuits 160 after making various adjustments to proposed IC layout 100 as described herein. Even after proposed IC layouts 100 have been adjusted, the previously proposed IC layouts 100 may remain in TDR 170 to further train predictive model 174 in subsequent predictions.

In the example process flow of FIG. 7, the flow can proceed to an additional process P7 after flagging proposed IC layout(s) 100 in processes P7, P8, or expanding TDR 170 in process P9. In process P10, layout adjustment program 220 can adjust one or more mask shapes in proposed IC layout 100 to adjust the size, shape, position, etc., of patterns 102, 104 to reduce or remove variously identified PSGs in proposed IC layout 100. To this extent, modules 222 of layout adjustment program 220 can adjust various patterns 102, 104 in proposed IC layout 100, e.g., by adjusting a corresponding mask shape in proposed IC layout 100 to affect related patterns 102, 104. Adjusting one or more masks in process P10 can thus adjust a pattern width, separation distance, pattern density, inter-layer size, etc., to mitigate the effects of processing variation on proposed IC layout 100 during manufacture. However, such adjustments may not necessarily account for all sensitivities in proposed IC layout 100 and/or may introduce new sensitivities elsewhere in proposed IC layout 100. In embodiments of the present disclosure, the flow can return to process P3 to repeat the predicting, manufacturing, determining, etc., in processes P3 through P10 for the adjusted proposed IC layout 100, with ORC data based on the new size, shape, position, etc., of patterns 102, 104 with the adjusted mask shape(s) from process P10, to reduce manufacturing variability.

Embodiments of the disclosure can optionally include using the adjusted mask shapes from process P10 to expand TDR 170. In particular, the adjusted form of proposed IC layouts 100 can be input to TDR 170, e.g., to further train predictive model 174 to calculate processing constraints for new IC layouts 100 and/or better predict the presence of PSGs in patterns 102, 104 thereof. Thus, the flow can include an optional process P11 (shown in phantom) of submitting an ORC simulation for proposed IC layout 100 with the adjusted mask shapes from process P10 to TDR 170 as data to further train and/or affect predictive model(s) 174 of various IC modeling programs 206. The various processes shown in FIG. 7 and described herein can then repeat, e.g., for a user-specified or machine-selected number of iterations before the process concludes ("Done"). The method can then be repeated for one or more other proposed IC layouts 100, with different predictive models 174 and/or IC modeling programs 206, etc., as desired to use and/or expand upon data of TDR 170.

Alternative Embodiments and Implementations

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be used. A computer readable storage medium may be, for example, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the layout, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As used herein, the term "configured," "configured to" and/or "configured for" can refer to specific-purpose patterns of the component so described. For example, a system or device configured to perform a function can include a computer system or computing device programmed or otherwise modified to perform that specific function. In other cases, program code stored on a computer-readable medium (e.g., storage medium), can be configured to cause at least one computing device to perform functions when that program code is executed on that computing device. In these cases, the arrangement of the program code triggers specific functions in the computing device upon execution. In other examples, a device configured to interact with and/or act upon other components can be specifically shaped and/or designed to effectively interact with and/or act upon those components. In some such circumstances, the device is configured to interact with another component because at least a portion of its shape complements at least a portion of the shape of that other component. In some circumstances, at least a portion of the device is sized to interact with at least a portion of that other component. The physical relationship (e.g., complementary, size-coincident, etc.) between the device and the other component can aid in performing a function, for example, displacement of one or more of the device or other component, engagement of one or more of the device or other component, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

predicting, via an integrated circuit (IC) modeling program of a computer system, process-sensitive geometries (PSGs) in a proposed IC layout based on violations of a set of processing constraints for the proposed IC layout, the set of processing constraints including a minimum pattern width and a minimum pattern separation, a pattern density, a topography-caused effect, and an inter-layer size in the proposed IC layout, the processing constraints being calculated with a predictive model based on a training data repository including an artificial neural network (ANN) with training data from a plurality of optical rule check (ORC) simulations for different IC layouts;

manufacturing a circuit using the proposed IC layout;

identifying, via the IC modeling program, actual PSGs in a scanning electron microscope (SEM) image of the circuit manufactured using the proposed IC layout;

determining, via the IC modeling program, whether the predicted PSGs correspond to the actual PSGs in the SEM image of the manufactured circuit as being correct, wherein at least one of the actual PSG not corresponding with one of the predicted PSGs indicates the predicting as being incorrect;

in response to the predicting being incorrect:
    adjusting, via the IC modeling program, the predictive model based on the actual PSGs in the SEM image of the manufactured circuit, wherein the adjusting includes:
        submitting additional ORC data to the training data repository, wherein the additional ORC data represents at least one actual PSG, not included in the predicted PSGs, to the training data repository, and
        recalculating the set of spatial-domain processing constraints based on the training data repository with the additional ORC data; and
    flagging the proposed IC layout as incorrectly predicted via the IC modeling program;

in response to the predicting being correct, flagging the proposed IC layout as correctly predicted via the IC modeling program;

adjusting a mask shape for the proposed IC layout based on the actual PSGs; and manufacturing an additional circuit using the proposed IC layout with the adjusted mask shape.

2. The method of claim 1, further comprising:
selecting, via the IC modeling program, a set of related ORC data for the proposed IC layout based on the manufactured circuit; and
in response to the proposed IC layout or the related ORC data not being represented in the training data repository, storing the proposed IC layout or the related ORC data in the training data repository.

3. The method of claim 1, further comprising repeating the predicting, manufacturing, and determining for the proposed IC layout, via the IC modeling program, with the adjusted mask shape.

4. The method of claim 1, further comprising adding ORC simulation data of the proposed IC layout with the adjusted mask shape to the training data repository.

5. The method of claim 1, wherein the training data repository includes at least one correctly predicted IC layout and at least one incorrectly predicted IC layout.

6. A computer program product stored on a computer readable storage medium, the computer program product comprising program code, which, when being executed by at least one computing device, causes the at least one computing device to:
predict, via an integrated circuit (IC) modeling program, process-sensitive geometries (PSGs) in a proposed IC layout based on violations of a set of processing constraints for the proposed IC layout, the set of processing constraints including a minimum pattern width and a minimum pattern separation, a pattern density, a topography-caused effect, and an inter-layer size in the proposed IC layout, the processing constraints being calculated with a predictive model based on a training data repository including an artificial neural network (ANN) with training data from a plurality of optical rule check (ORC) simulations for different IC layouts;
cause a manufacturing device to manufacture a circuit using the proposed IC layout;
identify, via the IC modeling program, actual PSGs in a scanning electron microscope (SEM) image of the circuit manufactured using the proposed IC layout;
determine, via the IC modeling program, whether the predicted PSGs correspond to the actual PSGs in SEM image of the manufactured circuit as being correct, wherein at least one actual PSG not being one of the predicted PSGs indicates the predicting as being incorrect;
in response to the predicted PSGs being incorrect:
adjust, via the IC modeling program, the predictive model based on the actual PSGs in the SEM image of the manufactured circuit, wherein the adjusting includes:
submitting additional ORC data to the training data repository, wherein the additional ORC data represents at least one actual PSG, not included in the predicted PSGs, to the training data repository, and
recalculating the set of processing constraints based on the training data repository with the additional ORC data; and
flag the proposed IC layout as incorrectly predicted via the IC modeling program;
in response to the predicted PSGs being correct, flagging the proposed IC layout as correctly predicted via the IC modeling program;
adjust a mask shape for the proposed IC layout based on the actual PSGs; and
instruct the manufacturing device to manufacture an additional circuit using the proposed IC layout with the adjusted mask shape.

7. The computer program product of claim 6, the computer program product further comprising program code for causing the at least one computing device to:
select, via the IC modeling program, a set of related ORC data for the proposed IC layout based on the manufactured circuit; and
in response to the proposed IC layout or the related ORC data not being represented in the training data repository, store the proposed IC layout or the related ORC data in the training data repository.

8. The computer program product of claim 6, the computer program product further comprising program code for causing the at least one computing device to repeat the predicting, manufacturing, and determining for the proposed IC layout, via the IC modeling program, with the adjusted mask shape.

9. The computer program product of claim 6, the computer program product further comprising program code for causing the at least one computing device to add ORC simulation data of the proposed IC layout with the adjusted mask shape to the training data repository.

10. The computer program product of claim 6, wherein the training data repository includes at least one correctly predicted IC layout and at least one incorrectly predicted IC layout.

11. A system comprising at least one computing device configured to perform a method by performing actions including:
predict, via an integrated circuit (IC) modeling program of the at least one computing device, process-sensitive geometries (PSGs) in a proposed IC layout based on violations of a set of processing constraints for the proposed IC layout, the set of processing constraints including a minimum pattern width and a minimum pattern separation, a pattern density, a topography-caused effect, and an inter-layer size in the proposed IC layout, the processing constraints and being calculated with a predictive model based on a training data repository including an artificial neural network (ANN) with training data from a plurality of optical rule check (ORC) simulations for different IC layouts;
cause a manufacturing device to manufacture a circuit using the proposed IC layout;
identify, via the IC modeling program, actual PSGs in a scanning electron microscope (SEM) image of the circuit manufactured using the proposed IC layout;
determine, via the IC modeling program, whether the predicted PSGs correspond to the actual PSGs in the SEM image of the manufactured circuit as being correct, wherein at least one actual PSG not being one of the predicted PSGs indicates the predicting as being incorrect;
in response to the predicted PSGs being incorrect:
adjust, via the IC modeling program, the predictive model based on the actual PSGs in the SEM image of the manufactured circuit, wherein the adjusting includes:
submitting additional ORC data to the training data repository, wherein the additional ORC data represents at least one actual PSG, not included in the predicted PSGs, to the training data repository, and recalculating the set of spatial-domain processing constraints based on the training data repository with the additional ORC data; and flag the proposed IC layout as incorrectly predicted via the IC modeling program; and in response to the predicted PSGs being correct, flagging the proposed IC layout as correctly predicted via the IC modeling program;

adjust a mask shape for the proposed IC layout based on the actual PSGs; and instruct the manufacturing device to manufacture an additional circuit using the proposed IC layout with the adjusted mask shape.

12. The system of claim 11, wherein the at least one computing device is further configured to:

select, via the IC modeling program, a set of related ORC data for the proposed IC layout based on the manufactured circuit; and in response to the proposed IC layout or the related ORC data not being represented in the training data repository, store the proposed IC layout or the related ORC data in the training data repository.

13. The system of claim 11, wherein the at least one computing device is further configured to repeat the predicting, manufacturing, and determining for the proposed IC layout with the adjusted mask shape.

14. The system of claim 11, wherein the at least one computing device is further configured to add ORC simulation data of the proposed IC layout with the adjusted mask shape to the training data repository.

* * * * *